(12) United States Patent
Allen et al.

(10) Patent No.: US 7,591,188 B2
(45) Date of Patent: Sep. 22, 2009

(54) STRESS AND/OR TENSION MONITORING SYSTEMS AND METHODS

(75) Inventors: Donald Wayne Allen, Richmond, TX (US); Li Lee, Houston, TX (US); Clay Douglas McMullen, Cypress, TX (US)

(73) Assignee: Shell Oil Company, Houston, TX (US)

( * ) Notice: Subject to any disclaimer, the term of this patent is extended or adjusted under 35 U.S.C. 154(b) by 35 days.

(21) Appl. No.: 11/559,202

(22) Filed: Nov. 13, 2006

(65) Prior Publication Data

US 2007/0193363 A1  Aug. 23, 2007

Related U.S. Application Data

(60) Provisional application No. 60/736,755, filed on Nov. 15, 2005.

(51) Int. Cl.
*G01N 3/10* (2006.01)
(52) U.S. Cl. ....................................................... 73/825
(58) Field of Classification Search ............ 73/825–826
See application file for complete search history.

(56) References Cited

U.S. PATENT DOCUMENTS

| | | | | |
|---|---|---|---|---|
| 3,810,081 | A * | 5/1974 | Rininger | 367/107 |
| 4,174,628 | A * | 11/1979 | van den Bussche et al. | 73/152.59 |
| 4,330,225 | A * | 5/1982 | Glasgow | 405/160 |
| 5,694,337 | A * | 12/1997 | Macken | 700/91 |
| 6,062,090 | A * | 5/2000 | Bachhuber et al. | 73/784 |
| 6,116,345 | A * | 9/2000 | Fontana et al. | 166/343 |
| 7,070,361 | B2 * | 7/2006 | McMillan et al. | 405/211 |
| 7,194,913 | B2 * | 3/2007 | Morrison et al. | 73/800 |
| 7,316,525 | B2 * | 1/2008 | Allen et al. | 405/211 |
| 7,328,741 | B2 * | 2/2008 | Allen et al. | 166/64 |
| 7,398,697 | B2 * | 7/2008 | Allen et al. | 73/800 |
| 2004/0035216 | A1 | 2/2004 | Morrison et al. | 73/800 |
| 2005/0103123 | A1 * | 5/2005 | Newman | 73/862.045 |
| 2005/0215340 | A1 * | 9/2005 | Stites et al. | 473/233 |
| 2006/0177275 | A1 | 8/2006 | Allen et al. | 405/224.2 |
| 2006/0230839 | A1 | 10/2006 | Morrison et al. | 73/800 |

FOREIGN PATENT DOCUMENTS

| | | |
|---|---|---|
| GB | 1241776 | 4/1971 |
| GB | 2186697 A | 8/1987 |
| WO | WO2004/018966 A1 | 4/2004 |
| WO | WO2006074309 A1 | 7/2006 |

OTHER PUBLICATIONS

TH2984—PCT. PCT/US2006/043979. International Search Report dated Feb. 27, 2007.
TH2984—PCT. PCT/US2006/043979. Written Opinion dated Mar. 8, 2007.
Remo Z. Machado et al. "Monitoring Program for the First Steel Catenary Riser Installed in a Moored Floating Platform in Deep Water". pp. 801-810.

* cited by examiner

*Primary Examiner*—Max Noori
(74) *Attorney, Agent, or Firm*—William E. Hickman

(57) ABSTRACT

There is disclosed a system comprising a structure, from 1 to 10 dynamic tension sensors, adapted to monitor a dynamic tension level of at least one point along a length of the structure, and a controller adapted to calculate a dynamic bending stress or strain level at a plurality of points along the length of the structure as a function of time. In some embodiments, the system also includes a vessel connected to the structure, wherein the vessel is floating in a body of water.

14 Claims, 4 Drawing Sheets

STRESS AND/OR TENSION MONITORING SYSTEMS AND METHODS

RELATED APPLICATIONS

This application claims priority to U.S. provisional application Ser. No. 60/736,755, filed on Nov. 15, 2005. U.S. provisional application Ser. No. 60/736,755 is herein incorporated by reference in its entirety.

FIELD OF INVENTION

The present disclosure relates to systems and methods for monitoring stress and/or tension in a structure.

BACKGROUND

Co-pending patent application having Ser. No. 11/326,873, filed Jan. 6, 2006, discloses a system comprising a structure, a vortex induced vibration monitoring system, adapted to monitor a vortex induced vibration level of the structure, a tensioner connected to the structure, and a controller adapted to calculate a tension on the structure to optimize the vortex induced vibration value of the structure. Patent application Ser. No. 11/326,873 is herein incorporated by reference in its entirety.

Co-pending patent application having Ser. No. 10/228,385, discloses apparatuses and methods of monitoring fatigue, structural response, and operational limits in structural components. More particularly, the application relates to fatigue, response, and operational monitoring systems on steel catenary risers using optical fiber sensors. The sensors can be pre-installed on new risers, or post-installed sub-sea on existing risers, using a variety of methods. Patent application Ser. No. 10/228,385 is herein incorporated by reference in its entirety.

Referring to FIG. 1, there is illustrated prior art system 100. X axis 102, Y axis 104, and Z axis 106 are all defined. System 100 includes vessel 110 floating in water 112. Structure 114 is connected to vessel 110, and structure 114 goes to bottom 116 of water 112. Current 118a, 118b, and 118c are all traveling in the X direction, and encounter structure 114. Vortexes 120a, 120b, and 120c are caused by the interaction of currents 118a-118c with catenary structure 114. Vortex induced vibrations (VIV) 122a, 122b, and 122c are caused by interaction of currents 118a-118c with catenary structure 114. Vortex induced vibrations (VIV) 122a, 122b, and 122c may cause dynamic tensions of various values along the length of structure 114. In addition, vessel 110 may heave up and down due to wave actions, which may also cause dynamic tensions of various values along the length of structure 114.

Dynamic tensions along the length of structure 114 may be a concern because if the dynamic tension exceeds a critical value the structure may break, and/or lower values of dynamic tension over time may lead to a fatigue failure of the structure. It is desired to monitor the dynamic tension values along the length of structure 114 over time.

As illustrated in FIG. 1, a plurality of sensors 150 may be placed along the length of structure 114 to measure the dynamic tension of structure 114 where the sensor 150 is placed. It may be difficult to install and/or maintain multiple sensors 150 at multiple locations along the length of structure 114.

There is a need in the art for systems and/or methods to monitor stress and/or tension in structures exposed to a current or wind or heave. There is a need in the art for improved systems and/or methods to monitor dynamic tension values in structures exposed to a current or wind or heave with a reduced number of sensors.

SUMMARY OF THE INVENTION

One aspect of the invention provides a system comprising a structure, from 1 to 10 dynamic tension sensors, adapted to monitor a dynamic tension level of at least one point along a length of the structure, and a controller adapted to calculate a dynamic bending stress or strain level at a plurality of points along the length of the structure as a function of time. In some embodiments, the system also includes a vessel connected to the structure, wherein the vessel is floating in a body of water.

Another aspect of the invention provides a method of calculating a dynamic tension level at a plurality of points along a length of a structure, the method comprising providing a structure, attaching from 1 to 10 dynamic tension sensors to the structure, monitoring a dynamic tension level of at least one point along a length of the structure with the sensors, transmitting the dynamic tension level of at least one point to a controller, and calculating a dynamic bending stress or strain level at a plurality of points along the length of the structure as a function of time with the controller.

Advantages of the invention include one or more of the following:

- a system and/or a method for calculating stress and/or strain values along the length of a structure without having to measure the values directly;
- a system and/or a method for monitoring stress and/or strain values along the length of a structure with a reduced number of sensors;
- a system with a reduced cost and/or complexity of installing the system to a structure;
- a system with a reduced cost and/or complexity of maintaining the system on a structure; and
- a system and/or a method for monitoring stress and/or strain values along the length of a structure with a reduced number and/or complexity of connections between sensors and a controller.

DETAILED DESCRIPTION OF THE FIGURES

In one embodiment, there is disclosed a system comprising a structure, from 1 to 10 dynamic tension sensors, adapted to monitor a dynamic tension level of at least one point along a length of the structure, and a controller adapted to calculate a dynamic bending stress or strain level at a plurality of points along the length of the structure as a function of time. In some embodiments, the system also includes a vessel connected to the structure, wherein the vessel is floating in a body of water. In some embodiments, the structure is selected from the group consisting of risers and mooring lines. In some embodiments, the system includes from 1 to 5 dynamic tension sensors. In some embodiments, the system also includes a vessel connected to the structure, wherein the vessel comprises an oil platform. In some embodiments, the structure comprises one or more strakes and/or fairings adapted to lower the vortex induced vibration value of the structure. In some embodiments, the system includes 1 dynamic tension sensor. In some embodiments, the system also includes a means for conveying the dynamic tension level from the sensors to the controller. In some embodiments, the means for conveying the dynamic tension level comprises an umbilical, a wire, a wireless device, an acoustic device, a radiofrequency device, a laser, or a light. In some embodiments, the sensors are within a body of water. In some embodiments, the controller is above a body of water. In some embodiments, the system also includes a power generator located within a body of water selected from the group consisting of a turbine, a nuclear reactor, a buoy, a thermo-electric device, and/or a battery to power the sensors. In some embodiments, the system also includes a power generator located above a body of water selected from the group consisting of a wind turbine, a solar panel, a water current turbine, and/or a battery to power the controller. In some embodiments, the sensors are located about a circumference of the structure at one point along an axis of the structure.

In one embodiment, there is disclosed a method of calculating a dynamic tension level at a plurality of points along a length of a structure, the method comprising providing a structure, attaching from 1 to 10 dynamic tension sensors to the structure, monitoring a dynamic tension level of at least one point along a length of the structure with the sensors, transmitting the dynamic tension level of at least one point to a controller, and calculating a dynamic bending stress or strain level at a plurality of points along the length of the structure as a function of time with the controller.

Figure 1:
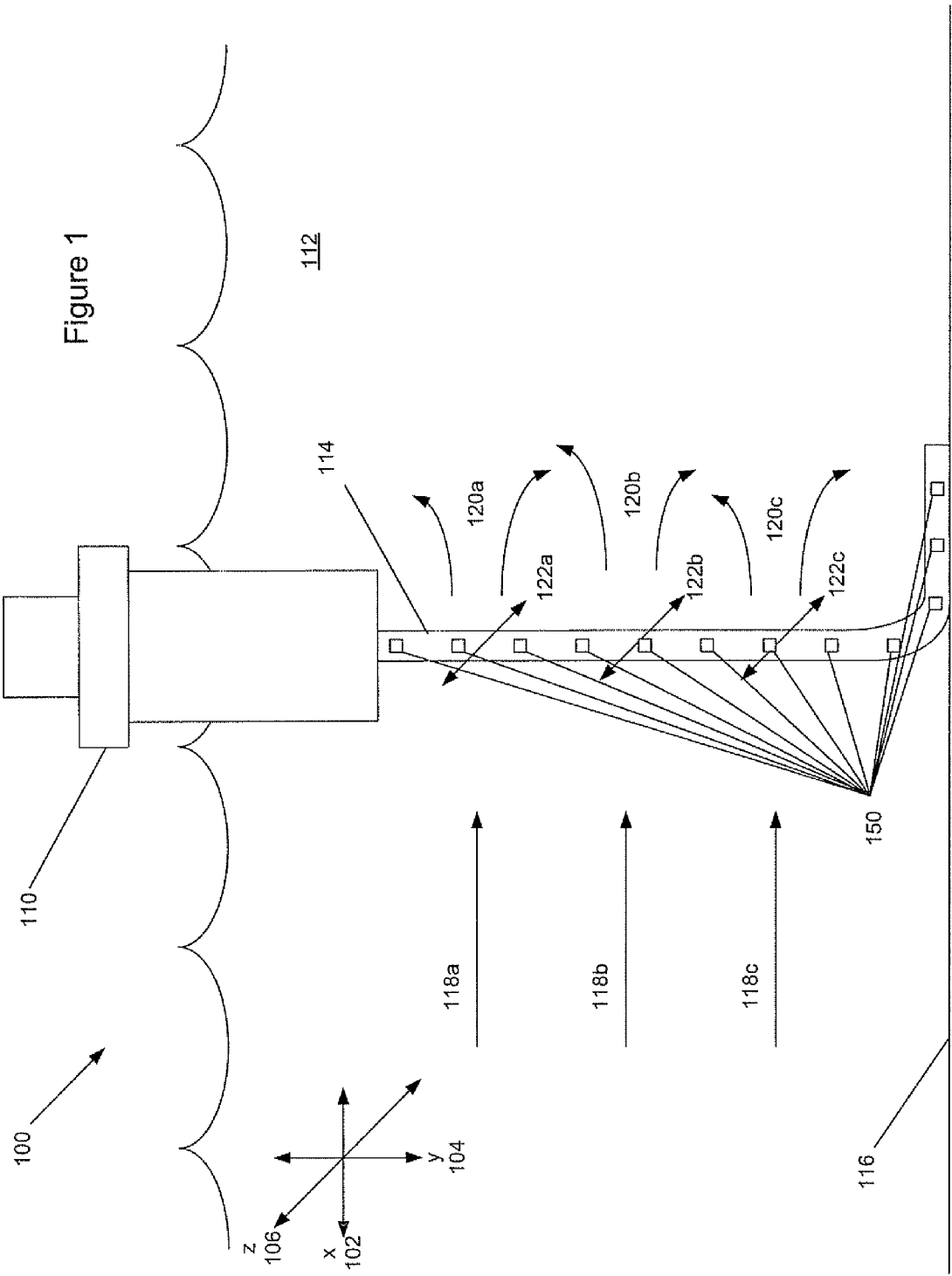
FIG. 1 illustrates a vessel floating in water connected to a structure.
Figure 2:
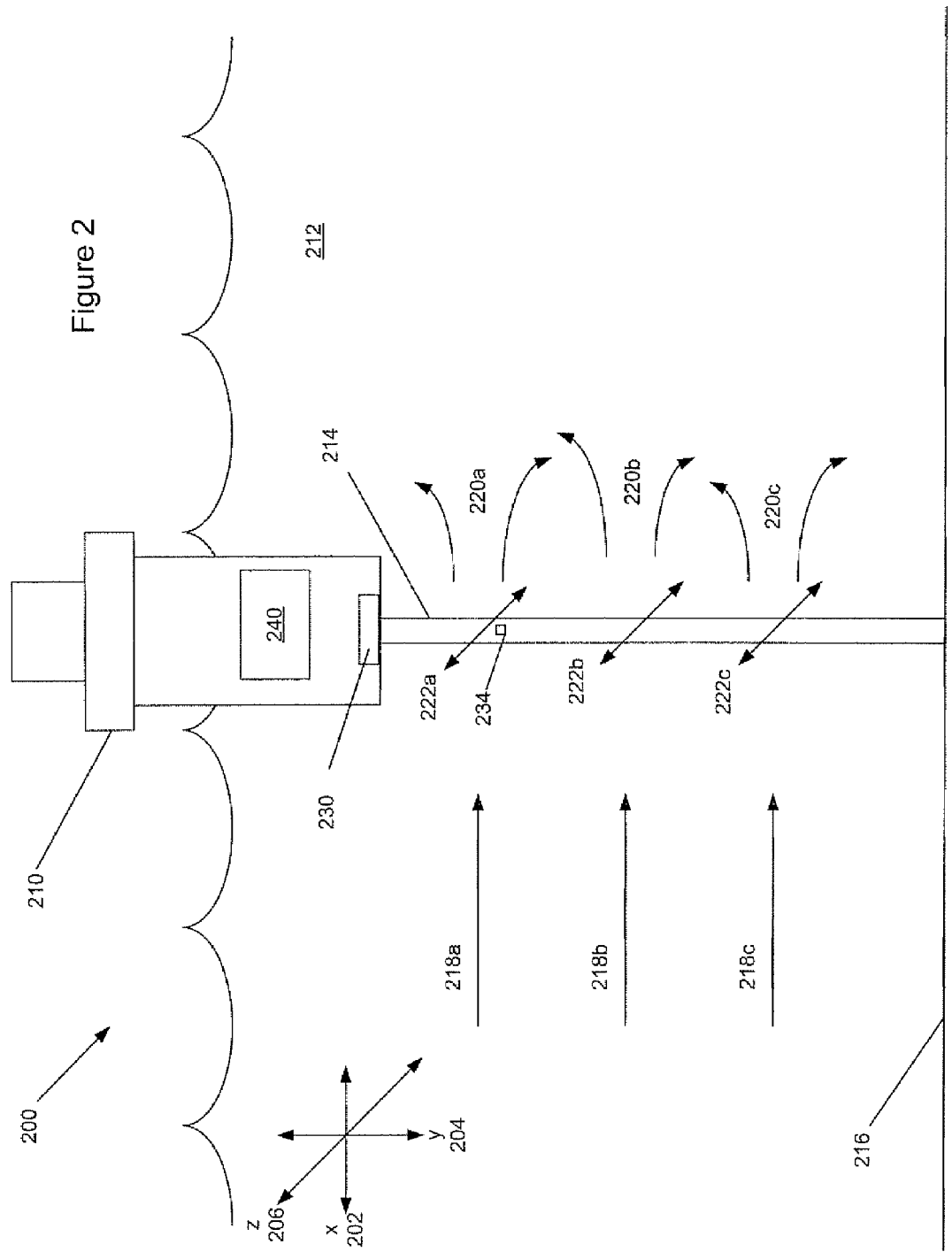
FIG. 2 illustrates a vessel floating in water connected to a structure.

Referring now to FIG. 2, in one embodiment of the invention, System 200 is illustrated. X axis 202, Y axis 204, and Z axis 206 are all defined. System 200 includes vessel 210 connected to structure 214, where structure 214 extends to bottom 216 of water 212. Currents 218a, 218b, and 218c encounter structure 214, which may be a catenary structure, causing vortexes 220a, 220b, and 220c, and VIV 222a, 222b, and 222c. In addition, vessel 210 may heave up and down and/or drift side to side. Vessel 210 includes tensioner 230, and controller 240. Sensor 234 is provided on structure 214, which measures VIV, dynamic tension, strain, and/or current.

Vortex induced vibration (VIV) is defined herein is a vibration having a given displacement and frequency of a structure caused by the vortexes which are caused by an ambient current. The VIV "level" is a function of the displacement and the frequency of the vibrations, with higher displacements and higher frequencies causing higher tensions, stresses, and/or strains, and lower displacements and lower frequencies causing lower tensions, stresses, and/or strains. It is generally desirable to lower the displacement and/or the frequency of VIV in a structure, for example to extend the structure's fatigue life.

Dynamic tension is measured as the value in newtons of the tension in the structure at a given point measured over time. Heave and/or drift of the structure 214, VIV, and/or current can all affect the dynamic tension values along the length of structure 214.

Figure 3:
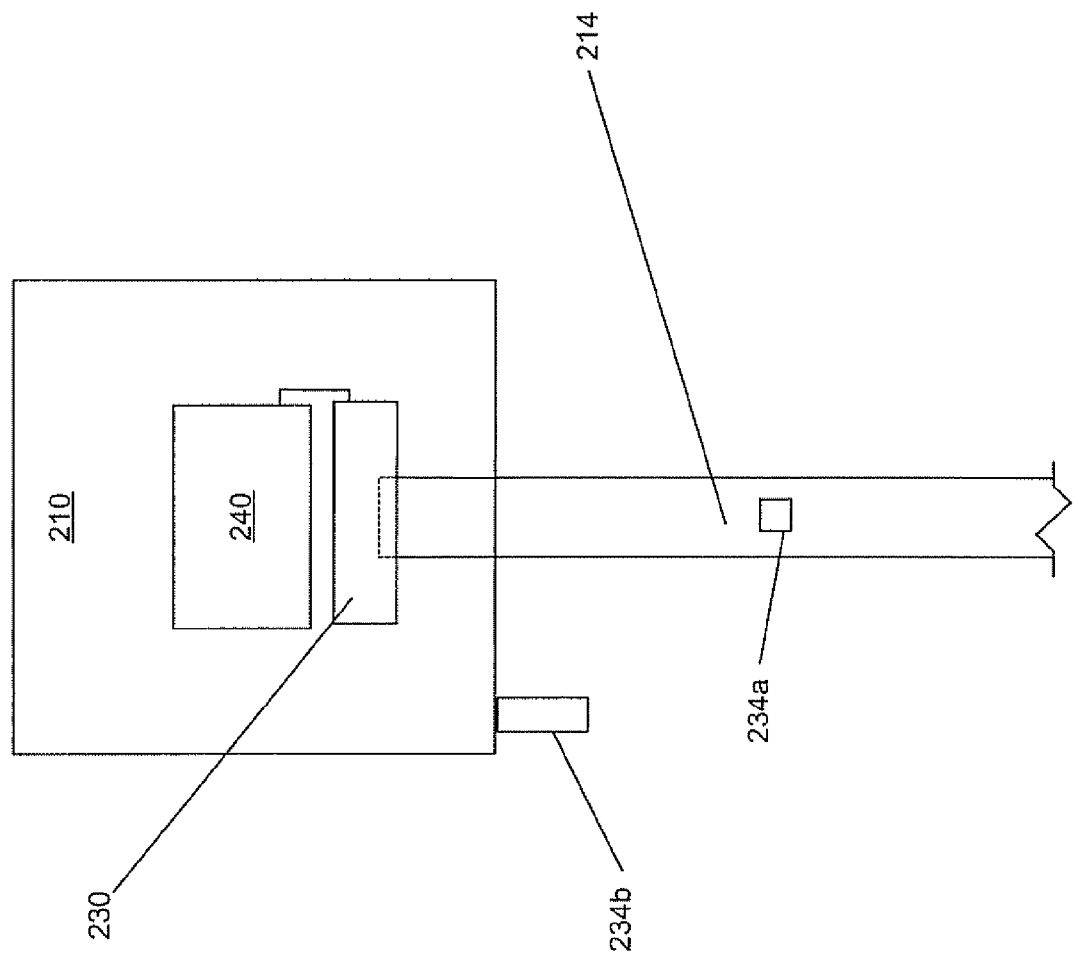
FIG. 3 illustrates a close-up view of the vessel and structure of FIG. 2.

Referring now to FIG. 3, a more detailed view of vessel 210 and structure 214 is provided.

Tensioner 230 is connected to structure 214, and is adapted to selectively increase or decrease the tension on structure 214. Sensor 234a is provided on structure 214, and is adapted to provide a measurement of the dynamic tension of structure 214 where it is installed on structure 214 and/or a measurement of current 218a. Sensor 234b is adapted to provide a measure of movement of vessel 210, and/or the ambient current. Controller 240 is adapted to receive input from sensors 234a and 234b, and to provide output of the dynamic tension values along the length of structure 214.

In some embodiments, sensors 234a and/or 234b may be connected to controller 240 by a wire, by a fiber optic connection, a cable, or another suitable direct connection. In some embodiments, sensors 234a and/or 234b may be connected to a transmitter to send a signal to controller 240 by sound, light, and/or a radiofrequency signal. The transmitter may be an audiophone, a light, a laser, a radio transmitter, or another suitable transmitter for an indirect connection.

In some embodiments, a suitable method of calculating dynamic tension values along the length of structure 214 from the dynamic tension measurement from sensor 234a and movement and current measurements from sensor 234b is by providing the tension and/or movement data to controller 240 which is running VIV calculation software commercially available from Shell Oil Company or one of its affiliates of Houston, Tex. Controller 240 then outputs dynamic tension values over the length of structure 214 as a function of time.

In some embodiments of the invention, VIV 222a-222c can be measured by a) measurement of structural motions; b) measurement of dynamic tension; c) measurement of an ocean current thought to produce VIV; or d) a combination of a) through c) Using a), both the frequency and displacement (at least at one or more measurement points) are known. If only b) is used, then the frequency may be known and the displacements may be inferred from the dynamic tension range. An analytical or computational model of the riser can be used to relate the dynamic tension to the riser displacement, for example, VIV calculation software commercially available from Shell Oil Company or its affiliates.

In some embodiments of the invention, vessel 210 may be a floating oil platform, for example a fixed platform, a tension leg platform, a spar, or a drilling rig.

In some embodiments of the invention, structure 214 may be a mooring line, riser, a tubular, a catenary riser, a production riser, or any other structure subject to current or wind. In some embodiments, structure 214 may have a diameter of about 0.1 to about 5 meters, and a length of about 10 to about 10,000 meters (m). In some embodiments, structure 214 may have a length to diameter ratio of about 100 to about 100,000. In some embodiments, structure 214 may be composed of about 50 to about 300 threaded tubular sections, each with a diameter of about 10 cm to about 60 cm and a length of about 5 m to about 50 m, and a wall thickness of about 0.5 cm to about 5 cm.

In some embodiments of the invention, tensioner 230 may be a commercially available ram style tensioner.

In some embodiments of the invention, controller 240 may be a commercially available topside computer.

In some embodiments, vessel 210 may have multiple structures 214 attached, for example about 5 to 30, or about 10 to 20.

In some embodiments, the structure includes one or more strakes or fairings, for example about 10 to about 100, adapted to lower the vortex induced vibration value of the structure. Suitable strakes are disclosed in U.S. Pat. No. 6,561,734, which is herein incorporated by reference in its entirety. Suitable fairings are disclosed in U.S. Pat. No. 6,223,672, which is herein incorporated by reference in its entirety.

Figure 4:
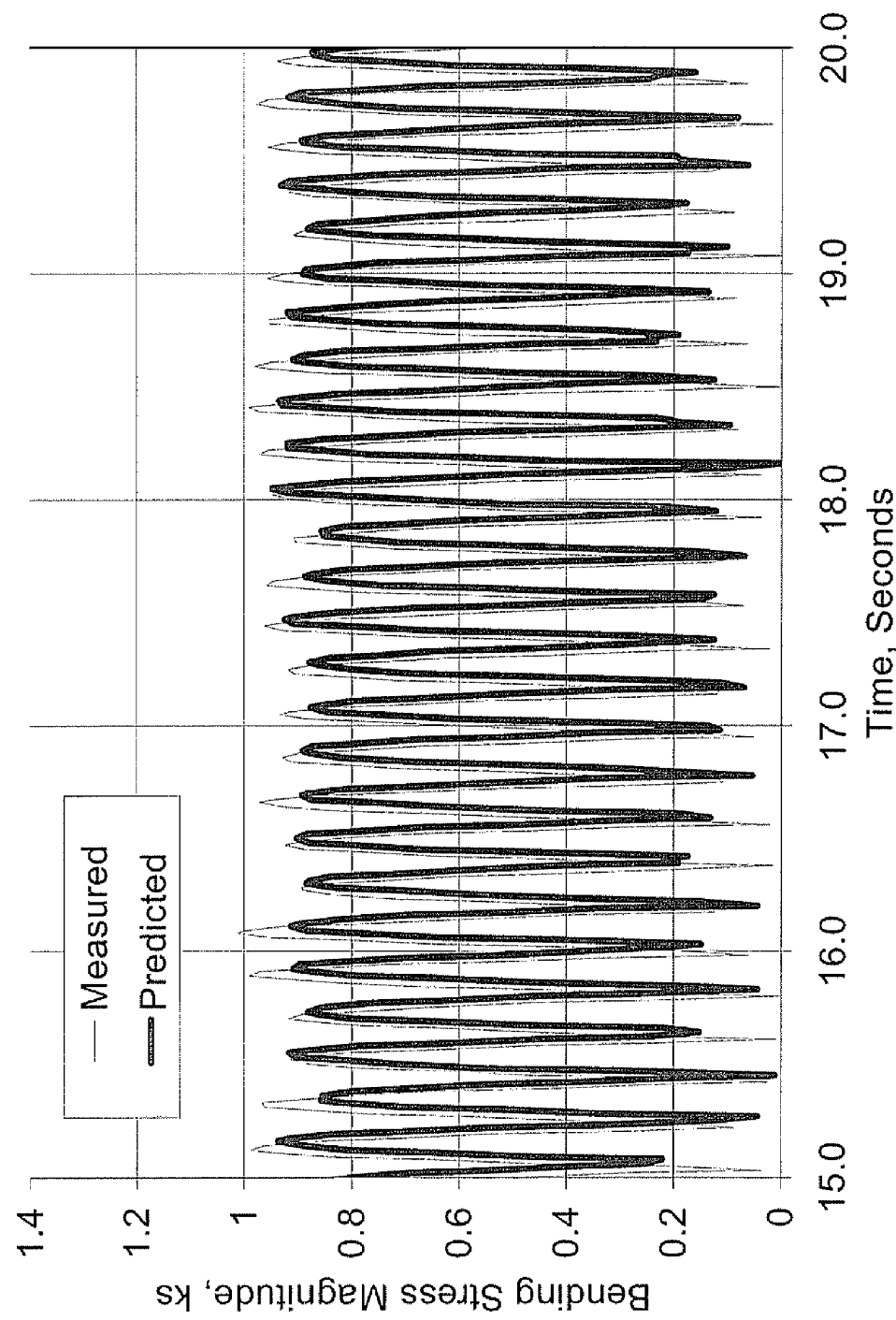
FIG. 4 illustrates an example of measured and predicted tension values over time.

Referring now to FIG. 4, data from a current tank test of an 11 centimeter diameter pipe, 3.65 meters in length. The pipe was subjected to a constant current flow of 1 meter per second. The bending stress as measured can be compared to the bending stress as calculated over time using an embodiment of the invention.

Those of skill in the art will appreciate that many modifications and variations are possible in terms of the disclosed embodiments, configurations, materials and methods without departing from their spirit and scope. Accordingly, the scope of the claims appended hereafter and their functional equivalents should not be limited by particular embodiments described and illustrated herein, as these are merely exemplary in nature.

The invention claimed is:

1. A system comprising:
   a structure;
   from 1 to 10 dynamic tension sensors, adapted to monitor a dynamic tension level of at least a first set of points along a length of the structure; and
   a controller adapted to calculate a dynamic bending stress or strain level at a second set of points along the length of the structure as a function of time, wherein the second set of points do not comprise dynamic tension sensors;
   wherein the structure comprises one or more strakes and/or fairings adapted to lower the vortex induced vibration value of the structure.

2. The system of claim 1, further comprising a vessel connected to the structure, wherein the vessel is floating in a body of water.

3. The system of claim 1, wherein the structure is selected from the group consisting of risers and mooring lines.

4. The system of claim 1, comprising from 1 to 5 dynamic tension sensors.

5. The system of claim 1, further comprising a vessel connected to the structure, wherein the vessel comprises an oil platform.

6. The system of claim 1, wherein the sensors are located about a circumference of the structure at one point along an axis of the structure.

7. The system of claim 1, consisting essentially of 1 dynamic tension sensor.

8. The system of claim 1, further comprising a means for conveying the dynamic tension level from the sensors to the controller.

9. The system of claim 8, wherein the means for conveying the dynamic tension level comprises an umbilical, a wire, a wireless device, an acoustic device, a radiofrequency device, a laser, or a light.

10. The system of claim 1, wherein the sensors are within a body of water.

11. The system of claim 1, wherein the controller is above a body of water.

12. The system of claim 1, further comprising a power generator located within a body of water selected from the group consisting of a turbine, a nuclear reactor, a buoy, a thermo-electric device, and/or a battery to power the sensors.

13. The system of claim 1, further comprising a power generator located above a body of water selected from the group consisting of a wind turbine, a solar panel, a water current turbine, and/or a battery to power the controller.

14. A method of calculating a dynamic tension level at a plurality of points along a length of a structure, the method comprising:
   providing a structure;
   attaching from 1 to 10 dynamic tension sensors to the structure;
   monitoring a dynamic tension level of at least a first set of points along a length of the structure with the sensors;
   transmitting the dynamic tension level of the first set of points to a controller; and
   calculating a dynamic bending stress or strain level at a second set of points along the length of the structure as a function of time with the controller, wherein the second set of points do not comprise dynamic tension sensors;
   wherein the structure comprises one or more strakes and/or fairings adapted to lower the vortex induced vibration value of the structure.

* * * * *